United States Patent [19]

Takagi et al.

[11] Patent Number: 4,687,942
[45] Date of Patent: Aug. 18, 1987

[54] METHOD OF READING CONCAVO-CONVEX BAR CODE

[75] Inventors: Haruyuki Takagi, Fujisawa; Takeshi Yonezawa, Hiratsuka, both of Japan

[73] Assignee: The Yokohama Rubber Co., Ltd., Tokyo, Japan

[21] Appl. No.: 726,787

[22] Filed: Apr. 24, 1985

[30] Foreign Application Priority Data

Nov. 29, 1984 [JP] Japan ................... 59-250524

[51] Int. Cl.$^4$ .................. G06K 5/00; G01N 21/86
[52] U.S. Cl. .................... 250/556; 250/571; 382/14
[58] Field of Search ........... 250/556, 566, 570, 571; 382/11, 12, 14, 58, 60

[56] References Cited

U.S. PATENT DOCUMENTS 4,533,825  8/1985  Yamada ........................ 382/12

FOREIGN PATENT DOCUMENTS 51-137331  11/1976  Japan.

Primary Examiner—Gene Wan
Attorney, Agent, or Firm—Finnegan, Henderson, Farabow, Garrett & Dunner

[57] ABSTRACT

In a method of reading a concavo-convex bar code disposed on the surface of an article, the improvement comprising the steps of scanning the concavo-convex bar code by a displacement sensor to detect the concavo-convexity, determining the areas of the resulting concavo-convex waveforms, and comparing the area thus obtained with the reference areas of the thick and thin bars of the bar code to judge the pattern of the bar code.

1 Claim, 4 Drawing Figures

METHOD OF READING CONCAVO-CONVEX BAR CODE

FIELD OF THE INVENTION

This invention relates to a method of reading a concavo-convex bar code. More particularly, the present invention relates to a method of reading a concavo-convex bar code which judges the size of each bar of a concavo-convex bar code formed on the surface of rubber or plastics by comparing the area of each bar.

DESCRIPTION OF THE PRIOR ART

Recently a bar code having wide black bars and narrow black bars in combination has been printed on the surface of an article rapidly to read, acknowledge and record a kind and a price of the article.

A concavo-convex bar code using thick and thin bars shaped in the concavo-convex form in place of the printed bar code has also been used for rubber products such as tires and molded articles such as plastic products.

To read the concavo-convex bar code, the judgement of the thick and thin waveforms of the bars read by a displacement sensor has been made conventionally by means of the width and height of each bar. Therefore, a reading error would occur unless the threshold for judgement necessary for digitizing reaches a predetermined level of the reading waveform detected from the sensor. In the case of the concavo-convex bar code, the base (center) of the waveform often inclines. In accordance with a conventional system using a mean value as the threshold, this results in the problem that non-detection of a certain bar or bars is likely to occur and reading becomes inaccurate. Since fine foreign matters are deposited on the concavo-convex bar code, noise is contained in the reading waveform of the concavo-convexity, and the unnecessary noise is often recognized erroneously as the waveform of the bar code.

SUMMARY OF THE INVENTION

In order to eliminate the problems of the conventional method of reading a concavo-convex bar code described above, the present invention is directed to provide a method of reaching a concavo-convex bar code which can optimize the level of a threshold even if any inclination exists in the base of a waveform, and can read correctly and accurately the concavo-convex bar code.

In a method of reading a concavo-convex bar code disposed on the surface of an article, the method of reading a concavo-convex bar code in accordance with the present invention to accomplish the object described above is characterized in that the concavo-convex bar code is scanned by a displacement sensor to detect the concavo-convexity, then the area of the resulting concavo-convex waveform is determined, and the area thus obtained is compared with the reference area of each of thick, wide lines and thin, narrow lines of the bar cord to judge the pattern of the bar code. The area of the concavo-convex waveform can also be determined after the detected concavo-convex waveform is shaped by a center value.

These and other objects and features of the present invention will become more apparent from the following description to be taken in conjunction with the accompanying drawings.

DESCRIPTION OF THE PREFERRED EMBODIMENT

Hereinafter, a preferred embodiment of the present invention will be described with reference to the accompanying drawings.

Figure 1:
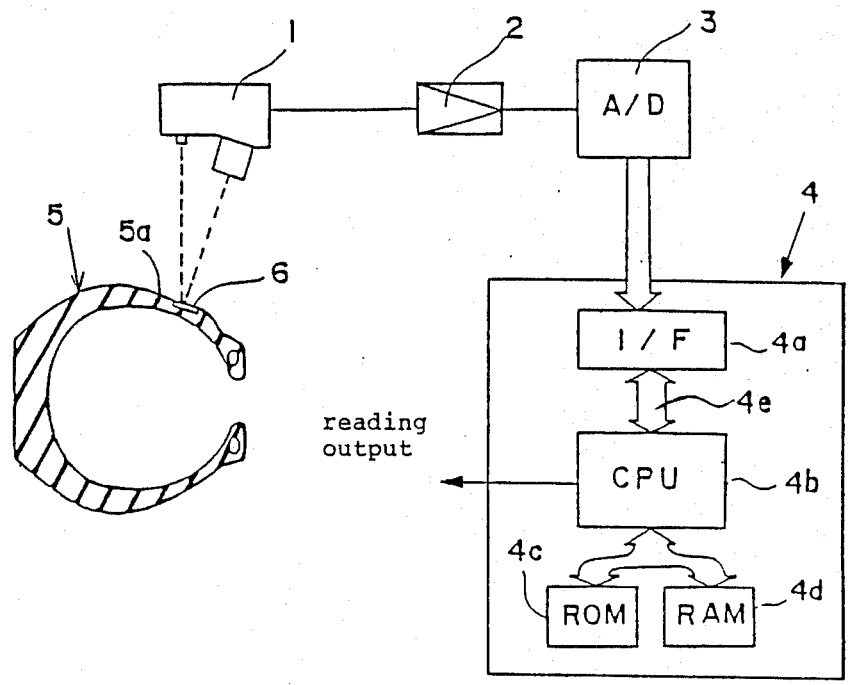
FIG. 1 is a block diagram showing an example of the construction of an apparatus used for practising the method of the present invention.

FIG. 1 shows an example of the construction of an apparatus used for practising the method of the present invention. This apparatus reads a concavo-convex bar code 6 disposed on a side wall 5a of a tire 5.

The tire 5 is rotatably supported by rotation means not shown, and a displacement sensor 1 which reads the concavo-convexity of the bar code 6 is disposed above the side wall 5a of the tire 5. An A/D convertor 3 is connected to the output of this sensor 1 through an amplifier 2, and the output of the A/D convertor 3 is connected to an operational unit such as a micro-computer 4.

In the micro-computer 4, an interface (I/F) 4a, a central processing unit (CPU) 4b, a read-only memory (ROM) 4c and a random access memory (RAM) 4d are connected mutually to a bus line 4e. ROM 4c stores therein a later-appearing unit time for the detected waveform from the sensor 1, a judgement value for judging the size of the bar code, and the like.

Figure 2:
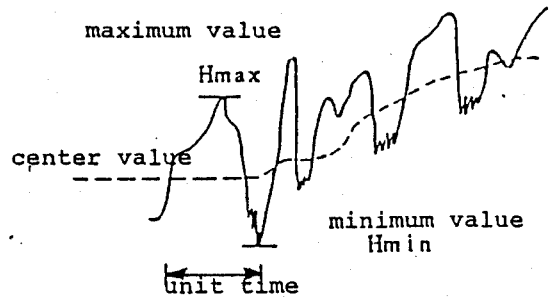
FIG. 2 is a waveform diagram showing the waveform of a concavo-convex bar code read by a displacement sensor shown in FIG. 1.

In the apparatus having the construction described above, the waveform of the bar code 6 on the tire 5, which is read by the displacement sensor 1, is detected as a waveform H such as shown in FIG. 2 whose base is not constant, because the tire is rotated by the rotation means while vibrating. The detected waveform is once stored in RAM 4d of the micro-computer 4. CPU 4b cuts the waveform H by a unit time t stored in ROM 4c to determined a maximum value $H_{max}$ and a minimum value $H_{min}$ of the waveform H within this unit time t, and calculates the center value $H_m$.

Figure 3:
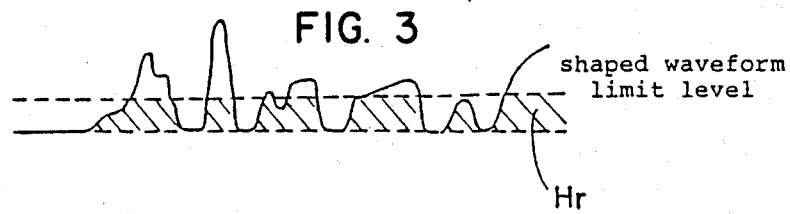
FIG. 3 is a waveform diagram showing the waveform obtained by shaping the waveform shown in FIG. 2.

Thereafter, CPU 4b uses the center value thus obtained as a threshold level within each unit time t, casts off the values below this threshold and shapes the waveform H to a waveform $H_s$ shown in FIG. 3.

Figure 4:
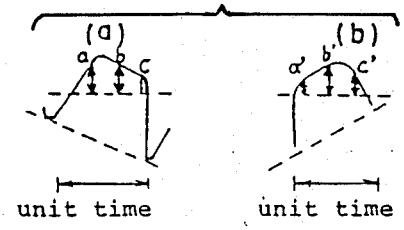
FIG. 4 is an explanatory view showing the method of minimizing the influence of the inclination of the base of the waveform by using the center value within a unit time as the object of threshold.

FIG. 4 illustrates the method of minimizing the influence of the inclination of the base of the waveform by using the center value $H_m$ within each unit time t as the threshold. Symbols a, c, a' and c' in the diagram represent the portions at which the inclination of the base is easily affected by the height of the bar after the application of the threshold because they are close to both ends of the unit time.

Since the center value $H_m$ is used as the threshold within each unit time t as described above, the present invention can reduce the influence of the inclination of the base of the waveform.

CPU 4b limits the portion of the shaped waveform $H_s$ that exceeds a predetermined value, and converts the shaped waveform $H_s$ to a waveform $H_r$ having a determined upper limit value (limit level) L. (See the portion represented by oblique lines in FIG. 3.) When the total area of the bar code is determined, this operation prevents the detection error when thin bars project.

Thereafter, the micro-computer 4 calculates the area of the portions below the limit level of the waveform $H_r$, and the area of each portion thus obtained is compared with the area of a thick bar (maximum area) and the area of a thin bar (minimum area) that are stored in advance in ROM 4c, thereby judging whether the area of each portion corresponds to the thick bar code or the thin bar code by the area comparison. The micro-computer 4 produces the result of judgement as a read-out output to other control instruments (not shown) connected thereto.

The calculation of determining the areas of the concavo-convex bar codes is nothing but one of the means of the method of the present invention, and various variations exist for the calculation method of determining the areas of the convavo-convex bar code.

Since the size of the bar codes is judged by the area comparison as described above, the waveforms due to the disturbance of fine areas are all cut off, so that an S/N becomes great and the level range of threshold becomes great. Therefore, the method of the present invention can drastically improve the reading accuracy in comparison with the conventional systems.

The method of reading the concavo-convex bar code described above can be applied to any of the concavo-convex bar codes disposed on the surface of articles besides the concavo-convex bar code disposed on the side wall of a tire.

As described above, the method of reading a concavo-convex bar code in accordance with the present invention is for reading the concavo-convex bar code disposed on the surface of an article, and comprises scanning the concavo-convex bar code by a displacement sensor to detect the concavo-convexity, determining the areas of the resulting concavo-convex waveforms and comparing the area thus obtained with the reference areas of the thick and thin bars of the bar code to judge the pattern of the bars. Therefore, the method of the present invention can improve an S/N, can expand the threshold level range and can drastically improve the reading accuracy.

What is claimed is:

1. A method for reading a raised bar code having a plurality of thick and thin bars comprising scanning the bar code with a displacement sensor to produce a waveform of the bar code, determining the maximum value and the minimum value of the waveform within a first given unit of time and calculating a center value $H_m$ thereof, repeating the calculation for a plurality of time units that shift sequentially along the waveform by a pitch less than the time unit and plotting the center values obtained, casting off the portions of the waveform below the plot of $H_m$ and producing a shaped waveform therefrom having a predetermined upper limit value L, determimiing the areas of the resulting waveform portions between $H_m$ and L and then comparing the areas thus obtained with reference areas of the thick and thin bars of the bar code to determine the pattern of the bar code.

* * * * *